United States Patent

Carvalho et al.

[11] Patent Number: 5,836,743
[45] Date of Patent: Nov. 17, 1998

[54] VARIABLE PITCH COUNTERWEIGHTED PROPELLER SYSTEM WITH RELEASABLE HYDRAULIC PITCHLOCK

[75] Inventors: Paul A. Carvalho, Westfield, Mass.; Robert W. Pruden, Enfield, Conn.

[73] Assignee: United Technologies Corporation, Windsor Locks, Conn.

[21] Appl. No.: 955,589

[22] Filed: Oct. 22, 1997

[51] Int. Cl.⁶ .................................................. B64C 11/38
[52] U.S. Cl. ...................... 416/139; 416/154; 416/157 R
[58] Field of Search ........................... 416/46, 139, 153, 416/154, 156, 157 R

[56] References Cited

U.S. PATENT DOCUMENTS

| | | | |
|---|---|---|---|
| 2,850,103 | 9/1958 | Pearl | 416/154 |
| 2,889,888 | 6/1959 | Fairhurst | 416/156 |
| 3,067,825 | 12/1962 | Chilman et al. | 416/157 R X |
| 3,219,121 | 11/1965 | Barden | 416/154 |
| 3,575,529 | 4/1971 | Bierman . | |
| 3,637,323 | 1/1972 | Chilman et al. | 416/139 |
| 3,690,788 | 9/1972 | Pedersen | 416/157 R |
| 3,746,466 | 7/1973 | Dallach et al. | 416/153 |
| 4,037,986 | 7/1977 | Chilman | 416/46 |
| 4,097,189 | 6/1978 | Harlamert | 416/154 X |
| 4,671,736 | 6/1987 | Finnigan | 416/46 |
| 4,717,312 | 1/1988 | Seeley . | |
| 4,863,347 | 9/1989 | Trott et al. | 416/154 X |
| 5,061,153 | 10/1991 | Pace et al. . | |
| 5,141,399 | 8/1992 | Duchesneau et al. | 416/165 X |
| 5,174,718 | 12/1992 | Lampeter et al. | 416/157 R X |

FOREIGN PATENT DOCUMENTS 2168505  6/1986  United Kingdom .................. 416/154

*Primary Examiner*—John E. Ryznic

[57] ABSTRACT

The hydraulic propeller system of the present invention has a central hub including a stationary portion and a rotatable portion. A plurality of propeller blades are connected with the rotatable portion, wherein each of the plurality of propeller blades has an adjustable pitch and a counterweight biasing the blades in a first pitch direction. An actuating mechanism is used for adjusting the pitch of each of the plurality of propeller blades. And a valve for locking the propeller blades at a last commanded pitch is further provided. At least the valve and the actuating mechanism are located on and rotatable with the rotatable portion.

12 Claims, 4 Drawing Sheets

VARIABLE PITCH COUNTERWEIGHTED PROPELLER SYSTEM WITH RELEASABLE HYDRAULIC PITCHLOCK

TECHNICAL FIELD

This invention is directed to propeller pitch control systems, and more particularly, to a propeller pitch control system for use with a counterweighted propeller system, which pitch control system includes a releasable hydraulic pitch lock on the rotating side of the propeller system.

BACKGROUD ART

Two current propeller systems are shown in prior art FIGS. 3 and 4. FIG. 3 is a basic representation of a counterweight propeller system without a pitch lock device and FIG. 4 is a basic arrangement for a noncounterweighted system which employs an Acme screw thread follow along pitch lock system. For the FIG. 3 embodiment wherein counterweights are used, each counterweighted blade produces a centrifugal twisting moment which causes the blades to go to coarse pitch in the event of hydraulic failure. However, as indicated, no mechanism is provided for locking the blades at the last commanded blade angle. In the FIG. 4 embodiment, the pitch locking screw system allows the propeller to operate in its last commanded blade angle before hydraulic failure and until it is overridden by the pilot. As can be seen from FIG. 4, the disadvantage of this system is its complexity and its associated high cost.

Various patents exist which are directed to propeller systems having adjustable pitch blades some of which use counterweights without a pitch lock system and some of which do not use counterweights, but include a pitch lock system.

Examples of patented systems which use counterweighted blades include those shown in U.S. Pat. No. 3,575,539, U.S. Pat. No. 4,650,402, and U.S. Pat. No. 4,671,736. Examples of patented systems using pitch lock type mechanisms include those shown in U.S. Pat. No. 5,141,399, U.S. Pat. No. 4,717,312, U.S. Pat. No. 4,097,189, U.S. Pat. No. 4,533,296, U.S. Pat. No. 4,037,986, and U.S. Pat. No. 5,061,153. Unlike the counterweighted systems listed above, these patents disclose relatively complicated mechanisms for adjusting the pitch angle of the propeller blades and for locking the same. In contrast, however, while the counterweighted systems are simpler in design, as indicated by the drawings, the advantage of locking the blades at the last commanded blade angle does not exist.

Of particular interest, however, is U.S. Pat. No. 4,671,736, listed above, entitled "An Apparatus for the Control of an Aerial Propeller". The apparatus is used for controlling the pitch of the blades of a propeller which is governor controlled. The pitch of the blades is variable between a coarse pitch limit and a fine pitch limit. The combination of a lock pitch solenoid valve 21 and an auto feather valve 18 is used to hold the propeller blades at a desired pitch while taxiing on the ground. In this system, the governor comprises a valve 16 and a hydraulic line connecting an actuator 13 with a hydraulic pump. Other valves are provided as a matter of established practice in the line and these include the lock pitch solenoid valve, which when actuated, cuts off any further flow of fluid from the pump towards the actuator and the auto feather valve which when actuated connects the hydraulic actuator to sump. Accordingly, during normal ground operation of an aircraft using this propeller system, the propeller has a low pitch limit set by beta valve 17. The beta valve 17 comes on line at a preselected value of blade angle and cuts off the governor valve 16 from actuator 13. Without using the beta valve, the governor valve 16 would continue to force a lower blade angle. Typically, on ground and in taxi, the propeller RPM at the preselected low blade angle to be determined by the Beta valve is too high and accordingly, too noisy. This patent is directed to a system for defeating the normal governing system while in taxi to force a high blade angle which results in lower propeller RPM and therefore, quieter operation during taxi.

In this particular system, the propeller blades are counterweighted towards high pitch or feather and are also biased towards high pitch by a spring. In order to get a higher blade angle, in this patent, the feather valve is opened to dump actuator pressure and allow the spring and counterweights to force the blades toward high pitch. The blade angle increases and the beta valve then cuts out, allowing the governor valve to come back on line. The governor valve provides flow and pressure to the actuator to try to get it back towards low pitch, but because of the low engine speed, the governor is unable to generate enough pressure. At the same time, the lock pitch solenoid valve 21 is de-energized to let the governor valve provide flow to the actuator. When the desired blade angle is reached, the feather valve is de-energized thus closing the passage to sump and re-energizing the lock pitch solenoid, thereby cutting off the governor valve. By de-energizing the feather valve, further blade angle changes towards high pitch are prevented. The governor must be cut off because the propeller is at an underspeed condition and the governor would try to correct this by going towards lower pitch.

The lock pitch solenoid valve 21, therefore, is used as a safety against blade angle excursion below the beta valve low pitch stop setting. In this particular design, the solenoid is electrically, not hydraulically actuated. The actuation of the lock pitch solenoid valve 21 is not automatic, but is apparently facilitated by direct pilot involvement.

In addition to the pilot, in combination with the lock pitch solenoid 21, a feather valve 22 must also be used. Also, in this particular embodiment, the lock pitch feature, including lock pitch solenoid valve 21, and feather valve 22 are located on the stationary side of the propeller. Accordingly, the system of U.S. Pat. No. 4,671,736 suffers from a plurality of short comings.

There exists a need, therefore, for an automated pitch lock system for use with a counterweighted variable pitch propeller system, which pitch lock system is automated and independent of the transfer bearing, thus unaffected by transfer bearing leakage, while allowing for a simple counterweighted system design and providing the ability to lock in the blade angle associated with the last known command.

DISCLOSURE OF INVENTION

The primary object of this invention is to provide an improved counterweighted propeller system having variable pitch blades and an automatic pitch lock system positioned on the rotatable side of the propeller system.

Another object of this invention is to provide a counterweighted propeller system including a pitch lock valve on the rotatable portion of the propeller system so as to lock the pitch of the propeller blades based on the detection of reduced hydraulic pressure, at the last known commanded blade angle, and before the counterweights take the blades to high pitch.

And yet another object of this invention is to provide a counterweighted propeller system, including a plurality of pitch adjustable blades and a pitch actuating mechanism for adjusting such pitch, wherein the system includes a hydraulic pitch lock system and means for controlling the pitch lock system for maintaining the same in a bypass mode until reduced pressure and hydraulic failure is sensed thereby.

The foregoing objects and following advantages are achieved by the a hydraulic propeller system of the present invention. The system comprises a central hub including a stationary portion and a rotatable portion. A plurality of propeller blades are connected with the rotatable portion, wherein each of the plurality of propeller blades has an adjustable pitch and a counterweight biasing the blades in a first pitch direction. An actuating mechanism is used for adjusting the pitch of each of the plurality of propeller blades. And a pitchlock valve for locking the propeller blades at a last commanded pitch is provided. At least the pitchlock valve and the actuating mechanism are located on and rotatable with the rotatable portion.

DETAILED DESCRIPTION OF THE INVENTION

Figure 1:
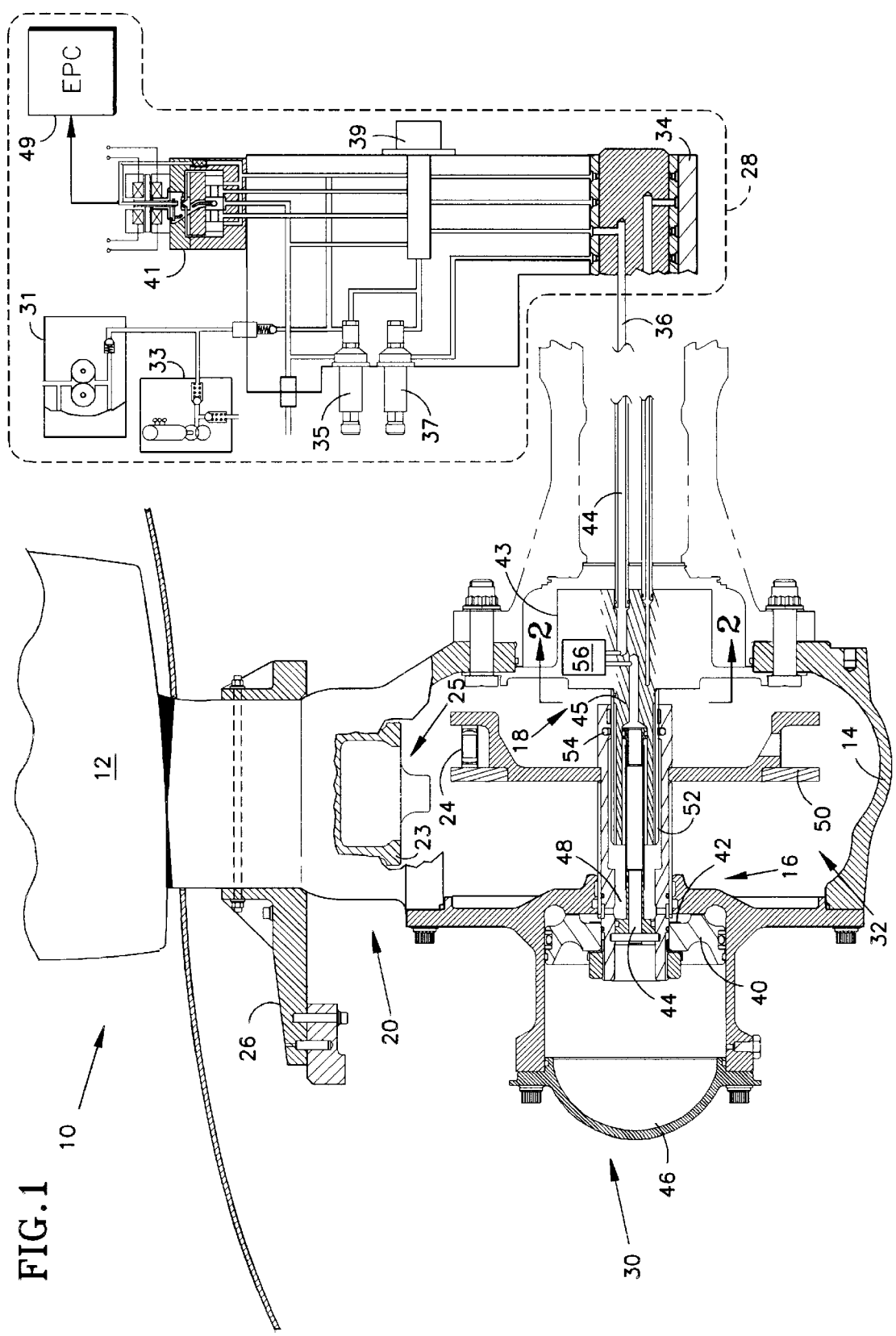
FIG. 1 is a detailed schematic view of the counterweighted propeller system in accordance with the principles of the present invention.

Referring now to the drawings in detail, there is shown in FIG. 1 a detailed schematic view of the propeller system of the present invention, designated generally as 10. System 10 generally includes counterweighted pitch adjustable propeller blades 12, hub 14, pitch change actuation mechanism 16, and a hydraulic pitch lock mechanism 18.

Counterweighted pitch adjustable propeller blades 12 are attached to hub 14 in a pitch adjustable manner, as known in the art. Preferably, blades 12 have an airfoil design as required by the specific aircraft application of the propeller system and are pitch adjustable relative hub 14 via a bearing 20, also known in the art. The bearing arrangement includes bearing races defined between blade root 23 and hub 14 for pitch adjustment of blade 12. At the inside end 25 of blade root 23, blade 12 is connected with pitch change actuated mechanism 16 via a device such as a cam follower 24 or gear arrangement (not shown). Counterweighted pitch adjustable propeller blades 12 also include counterweights 26 attached thereto for rotating blades 12 to high pitch in the case of hydraulic failure so as to allow for the continued safe operation of the aircraft. System 10 includes a non-rotating control portion 28, as indicated by the dotted lines and the dotted line box, substantially on the right side of FIG. 1 and a rotatable portion 30, as indicated by the solid lines in FIG. 1, substantially on the left side. Hub 14 defines an interior portion 32 which, as shown in FIG. 1, includes the main components of propeller system 10. A hydraulic fluid transfer bearing 34 separates the rotatable portion 30 from the non-rotatable control portion 28 and defines a mechanism for the transfer of hydraulic fluid to and from the mechanisms on the rotatable portion 30. As indicated above, the main elements of the system are located in the rotatable portion 30 and accordingly, the risk associated with transferring fluid via the transfer bearing 34 between the stationary and rotational sides does not immediately effect these components, thereby increasing the safety of the propeller system.

In a manner and arrangement substantially known in the art, the non-rotatable control portion 28 includes a fluid pump 31, an auxiliary pump motor 33, a feather solenoid 35, a secondary low pitch stop solenoid 37, protection valve 39, and an electronic hydraulic valve (EHV) 41. The EHV functions to integrate and control these elements as well as the various fluid flows to and from actuation mechanism 16.

Pitch change actuation mechanism 16 includes a hydraulic fluid transfer tube 36 for transferring fluid from the stationary control portion 28 to piston 40. Fluid is transferred through tube 36 to a manifold 43 secured to hub 14, to the high pitch side 42 of piston 40 via channel 44 and fluid is transferred to the low pitch side 46 of piston 40 via channel 48. An elongated member 45 extends from manifold 43, toward piston 40, through which channels 44 and 48 continue to the low and high pitch sides of piston 40. Accordingly, when it is desired to move the propeller blades 12 to a higher pitch, fluid is transferred to the high pitch side 42 of piston 40 and when it is desired to move the propellers to a lower pitch, fluid is transferred to the low pitch side 46 of piston 40. As indicated above, if there is a hydraulic failure with the pitch change actuator mechanism 16, the counterweights 26 of the propeller blades 12 will rotate the blades towards high pitch or feather so as to allow the continued safe operation of the aircraft. When the fluid is transferred to the low pitch side for displacement of piston 40 to the right or to the high pitch side for displacement of piston 40 to the left, yoke 50 is translated linearly and, in the particular embodiment shown, functions to rotate the eccentricity positioned cam followers 24, for each blade, so as in induce rotation in the desired high or low pitch direction. Translatory motion is induced to yoke 50 via support 52 which connects piston 40 and yoke 50. Support 52 moves on glide rings 54 concentric to elongated member 45 and as indicated above, is connected to both the piston and the yoke for transferring motion therebetween.

Hydraulic pitch lock mechanism 18 is operative to lock in the most recently commanded blade angles of blades 12 upon the detection of a loss in hydraulic pressure being supplied to transfer tube 36 for movement of the piston 40 in the low pitch and the high pitch direction. Hydraulic pitch lock mechanism 18 is positioned on the rotational portion of hub 14, in the path of pressurized fluid flow $P_f$ from stationary control portion 28 to the low pitch side 46 of piston 40, in the location as shown in FIG. 1 and in the enlarged view of FIG. 2. This positioning on the rotatable portion avoids the danger of potential leakage associated with placing such a device on the non-rotatable control portion 28 of the system and relying on the transfer bearing 34 for the transfer of hydraulic fluid and thus pressure thereto.

Figure 2:
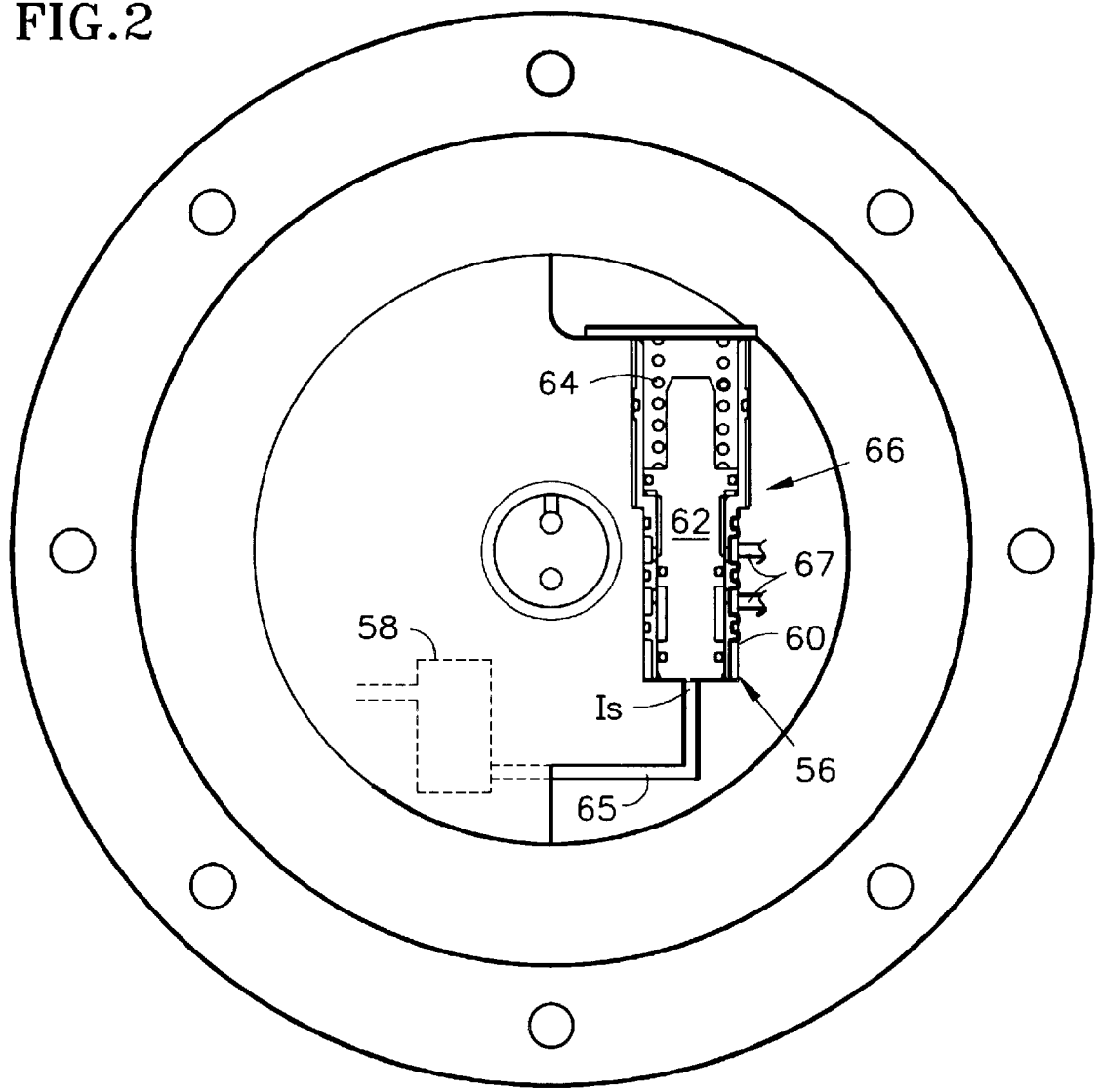
FIG. 2 is a simplified, schematic cross-sectional view of the hydraulic pitch lock valve used in the system shown in FIG. 1 and taken along line 2—2 of FIG. 1.
Figure 3:
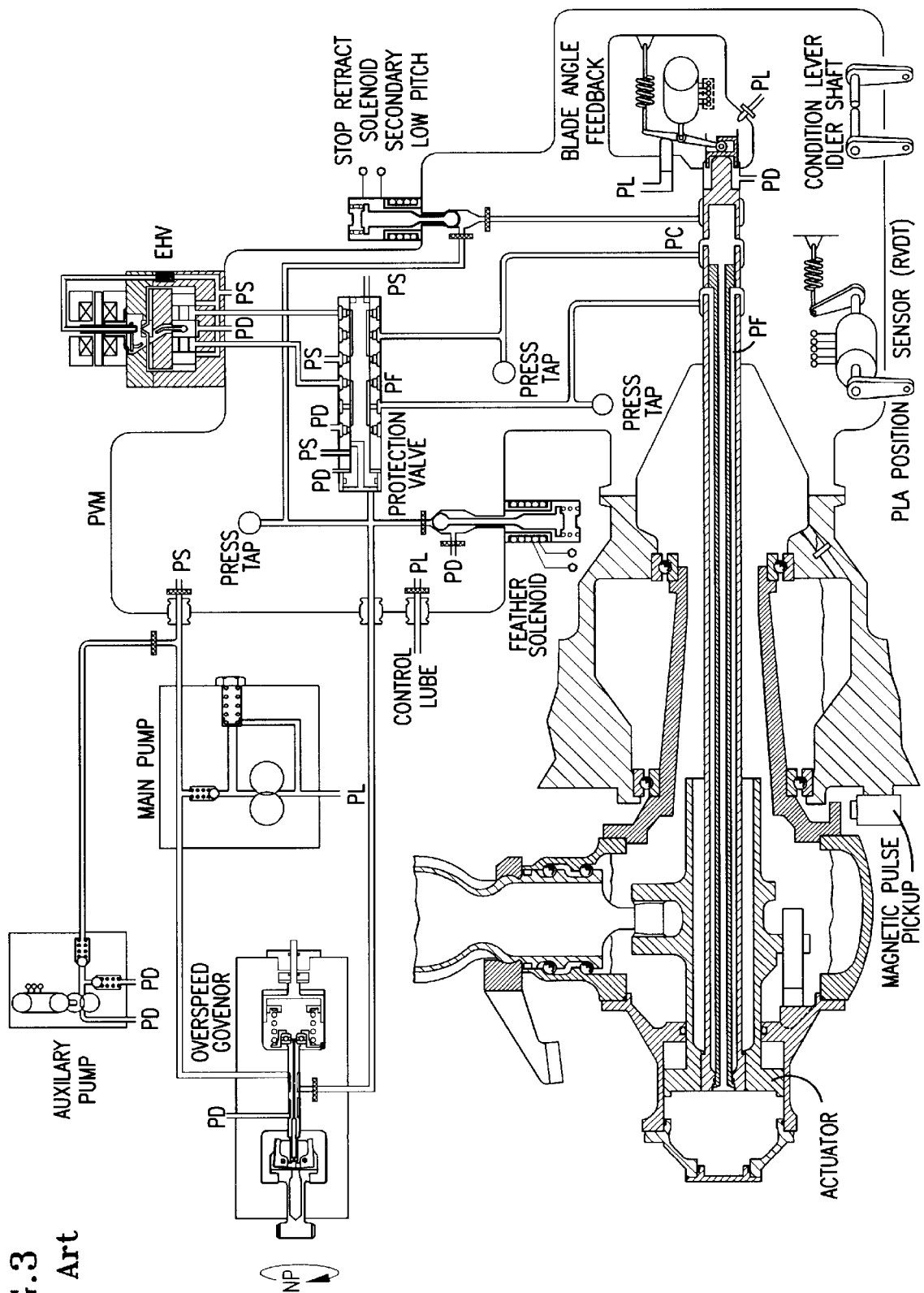
FIG. 3 is a schematic representation of a prior art propeller system.
Figure 4:
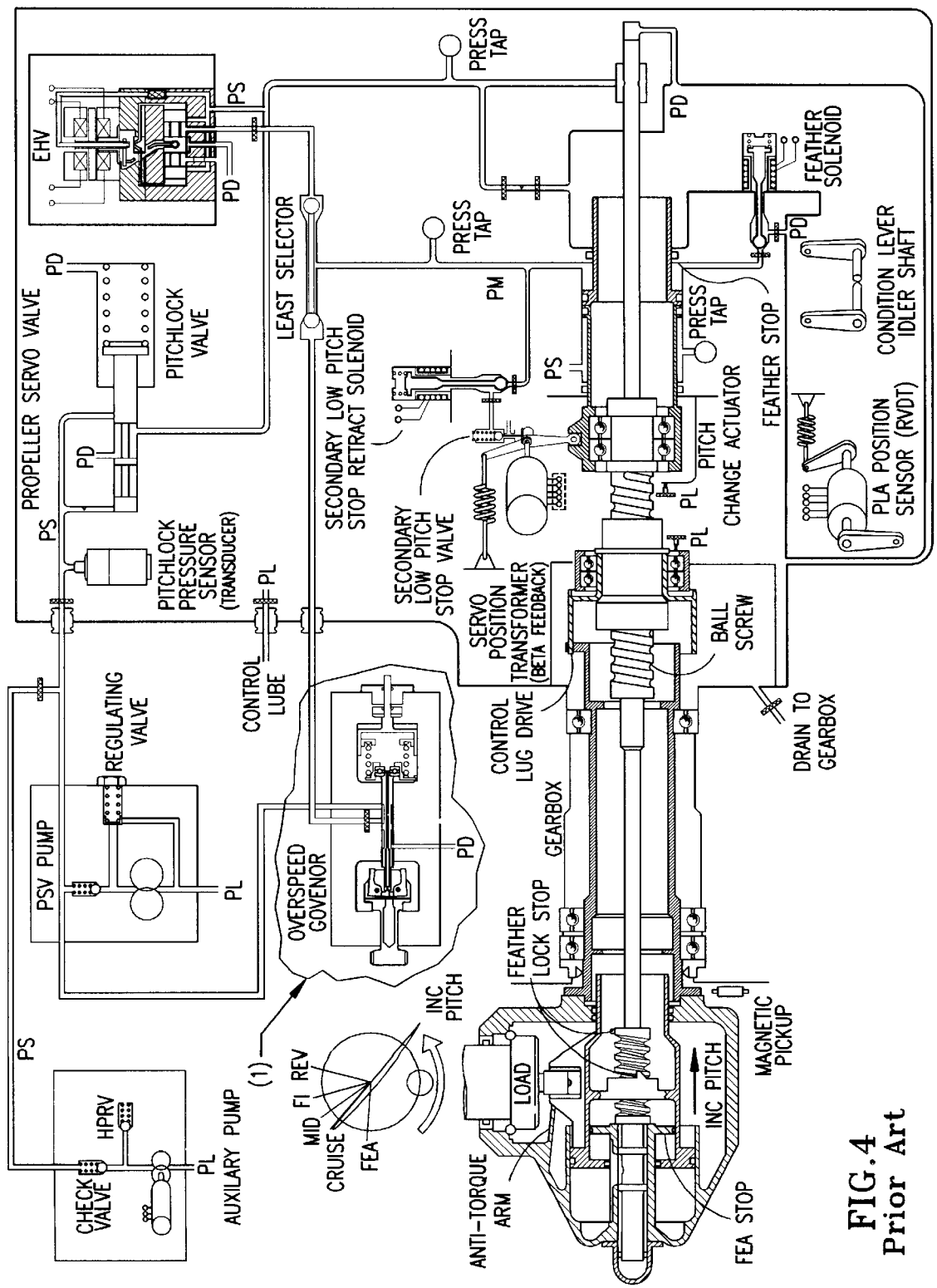
FIG. 4 is a schematic representation of another prior art propeller system.

As shown in FIG. 2, hydraulic pitch lock mechanism 18 is preferably comprised of pitch lock valve 56 through which hydraulic fluid can flow back and forth to low pitch side 46 of piston 40. Pitch lock mechanism 18 is shown in the shifted, actuator deadheaded position, preventing fluid flow to and from the piston. The mechanism includes means for maintaining pitch lock valve 56 in the bypass mode during normal actuator operation as opposed to the deadheaded operation mode, as shown.

Pitch lock valve 56 is located as indicated in the drawings in rotatable portion 30 and includes a housing 60 within which is positioned a spool 62 and a spring 64. On side 66 of valve 56, are located hydraulic fluid connections 67, whereby fluid under pressure $P_f$ or $P_D$, fine or decrease pressure, bypasses through valve 56 in the bypass or normal operating position. A hydraulic pressure which is indicative of the state of the system hydraulics is provided to valve 56 through one of connections 67. The spring is selected with a spring constant providing a force less than the pressure directed to the valve in normal operation via one of connections 67. This pressure is preferably in the form of $P_S$, supply pressure, but may be in the form of $P_I$, increase pitch pressure, or $P_D$, decrease pitch pressure. As indicated alternatively and schematically by the dotted lines, a second valve 58 may be provided for selecting and/or directing one of $P_S$, $P_I$, and $P_D$, to valve 56. In the event that a measure of one of these pressures indicates a loss of systems hydraulics due to system failure, spool 62 is caused to shift to the pitch lock position via spring 64, as shown, whereat the low pitch side 46 of the actuator piston 40 is dead-headed, preventing the supply of hydraulic fluid from piston 40 to the stationary control portion 28. The shift also cuts off any drain from piston 40, thereby deadheading the low pitch side 46 of piston 40. By deadheading low pitch side 46 via pitch lock valve 56, piston 40 can no longer move toward increase pitch. Accordingly, since the counterweights 26 are designed to move the blades 12 towards high pitch, the combination of the blade biasing towards high pitch and the deadheading of the low pitch side causes the blades to be pitch locked.

In operation, system 10 normally functions to supply hydraulic fluid through transfer tube 36 via hydraulic fluid transfer bearing 34 from the non-rotatable control portion 28 to the various components on the rotatable portion 30, under the command of EHV 41. On its way to piston 40 for moving the same in the low pitch direction, fine or low pitch fluid $P_f$ or $P_D$ passes through pitch lock valve 56. In normal operation, hydraulic fluid is drained from the piston side which opposes the desired pitch change. One of $P_S$, $P_I$, and $P_D$ is used to maintain pitch lock valve 56 in the bypass position. If hydraulic failure occurs whereby hydraulic pressure drops such that it is no longer able to oppose the force of spring 64, spring 64 is operative to reposition spool 62 such that the path of fine pressure $P_f$ enroute to or returning from the low pitch side of piston 40 is blocked. The piston 40 becomes deadheaded on the low pitch side 46 thereby preventing counterweights 26 from rotating blades 12 towards high pitch. The combination of the counterweights biasing the blades towards high pitch and the deadheaded state of the low pitch side 46 of piston 40 prevents any rotation of blades 12, thereby locking the blades in the last commanded pitch angle position. Accordingly, the aircraft engine may continue to operate its propeller system in a safe and effective operation mode, and not in the feather mode as required in previous counterweighted propeller systems. The positioning of the pitch lock valve on the rotatable portion 30 of system 10 prevents leakage in the transfer bearing from effecting the performance of the pitch lock system.

The primary advantage of this invention is that an improved counterweighted propeller system is provided having variable pitch blades and an automatic pitch lock system positioned on the rotatable side of the propeller system. Another advantage of this invention is that a counterweighted propeller system is provided including a pitch lock valve on the rotatable portion of the propeller system so as to lock the pitch of the propeller blades based on the detection of reduced hydraulic pressure, at the last known commanded blade angle, and before the counterweights take the blades to high pitch. And yet another advantage of this invention is that a counterweighted propeller system is provided, including a plurality of pitch adjustable blades and a pitch actuating mechanism for adjusting such pitch, wherein the system includes a hydraulic pitch lock system and means for controlling the pitch lock system for maintaining the same in a bypass mode until reduced pressure and hydraulic failure is sensed thereby.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A hydraulic propeller system, comprising:
   a central hub including a nonrotatable portion and a rotatable portion;
   a plurality of propeller blades connected with said rotatable portion, wherein each of said plurality of propeller blades has an adjustable pitch and a counterweight biasing said blades in a first pitch direction;
   actuation means for adjusting said pitch of each of said plurality of propeller blades; and
   means for locking said propeller blades at a last commanded pitch,
   wherein said means for locking is located on and rotatable with said rotatable portion.

2. The propeller system according to claim 2, wherein said means for locking comprises a valve in hydraulic communication with said actuation means via a first hydraulic pressure.

3. The propeller system according to claim 2, wherein said valve includes means for sensing a hydraulic pressure level, wherein if said means for sensing senses a drop in said hydraulic pressure level indicative of a system failure, said valve is activated for causing locking of said pitch at a last commanded blade angle.

4. The propeller system according to claim 3, wherein said valve includes means for preventing drain of hydraulic fluid from said actuation means and means for preventing flow of fluid to said actuation means thereby preventing pivoting of said propeller blades in said first pitch direction toward which said counterweights bias said blades.

5. The propeller system according to claim 3, further including a secondary valve for selecting said hydraulic pressure level for direction to said valve.

6. The propeller system according to claim 3, wherein said hydraulic pressure level is one of supply pressure, increase pressure and decrease pressure.

7. The propeller system according to claim 3, wherein said hydraulic pressure level is measured from a pressure indicative of the state of the system.

8. The propeller system according to claim 4, wherein said valve comprises a spool and a spring for biasing said spool in a direction for placing said valve in operation, said means for sensing comprising said spring and said input located on opposing ends of said spool, wherein said spring is designed to compress under the force of said hydraulic pressure level for bypass of said first hydraulic pressure through said valve during normal propeller operation and wherein said spring is designed to expand and activate said valve by overcoming the force of said hydraulic pressure level during system failure and facilitate the deadheading of said actuator in opposition of the first pitch direction of biasing by said counterweights.

9. The propeller system according to claim 2, wherein said actuator means comprises a piston connected to a yoke and a support member, said yoke connected to said blades and said support member for supporting and guiding said piston while in translatory motion, wherein said piston includes a fine pitch side to which fine pitch pressure is directed for adjusting said blades toward low pitch via said yoke and a coarse pitch side to which coarse pitch pressure is directed for adjusting said blades toward coarse pitch via said yoke.

10. The propeller system according to claim 9, wherein said valve includes means for receiving said one of said coarse and fine pitch pressures for maintaining in a bypass position.

11. The propeller system according to claim 3, wherein said rotatable portion includes said actuator means, said propeller blades, and said valve, said nonrotatable portion defining a system control and including means for controlling the flow of hydraulic fluid.

12. The propeller system according to claim 11, further comprising a transfer bearing interfacing said stationary portion and said rotatable portion for facilitating the flow of hydraulic fluid from the system control to and between said valve and said actuator means.

* * * * *